(12) United States Patent
Shimanaka et al.

(10) Patent No.: US 11,518,445 B2
(45) Date of Patent: Dec. 6, 2022

(54) SIDE VEHICLE BODY STRUCTURE OF VEHICLE

(71) Applicant: MAZDA MOTOR CORPORATION, Hiroshima (JP)

(72) Inventors: Tsuneki Shimanaka, Aki-gun (JP); Hiroshi Tanaka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 137 days.

(21) Appl. No.: 17/177,972

(22) Filed: Feb. 17, 2021

(65) Prior Publication Data

US 2021/0276625 A1 Sep. 9, 2021

(30) Foreign Application Priority Data

Mar. 6, 2020 (JP) .............................. JP2020-038729

(51) Int. Cl.
| | |
|---|---|
| *B62D 25/20* | (2006.01) |
| *B60K 13/04* | (2006.01) |
| *B62D 25/04* | (2006.01) |
| *B60K 13/00* | (2006.01) |

(52) U.S. Cl.
CPC .......... *B62D 25/2036* (2013.01); *B60K 13/00* (2013.01); *B60K 13/04* (2013.01); *B62D 25/04* (2013.01)

(58) Field of Classification Search
CPC ........ B60K 13/04; B60K 13/06; B62D 25/02; B62D 25/04; B62D 25/2036
See application file for complete search history.

(56) References Cited

U.S. PATENT DOCUMENTS

| 11,299,025 | B2* | 4/2022 | Tropee ..................... F01N 3/00 |
| 2005/0167968 | A1* | 8/2005 | Mabuchi ................ B62D 21/02 |
| | | | 181/227 |
| 2008/0163613 | A1* | 7/2008 | Mabuchi ............. F01N 13/1816 |
| | | | 181/227 |
| 2011/0278881 | A1* | 11/2011 | Asai ...................... B60K 15/063 |
| | | | 296/193.07 |
| 2017/0106743 | A1* | 4/2017 | Ajisaka .................. B62D 25/20 |
| 2017/0106744 | A1* | 4/2017 | Ajisaka .................... B60K 1/04 |
| 2017/0106916 | A1* | 4/2017 | Ajisaka .................. B60K 13/04 |
| 2017/0113731 | A1* | 4/2017 | Imura ....................... B60K 1/04 |

(Continued)

FOREIGN PATENT DOCUMENTS

JP 2018-039452 A 3/2018

*Primary Examiner* — Jeffrey J Restifo
(74) *Attorney, Agent, or Firm* — Studebaker & Brackett PC (57) ABSTRACT

An exhaust system member is provided on a vehicle-width-direction outer side relative to a vehicle body structure on the side of a floor, while avoiding widening of the vehicle and preserving small overlap collision resistance. Embodiments include an engine disposed forward of a partition wall defining a front edge of a vehicle cabin, an exhaust apparatus, a side sill extending along the vehicle front-rear direction on the side of a floor forming a floor surface of the vehicle cabin, and a hinge pillar extending vertically from the side sill. A frame member extends toward the vehicle front side from the hinge pillar and has a front end, on the rear side of a vehicle wheel, overlapping with a vehicle-width-direction length area of the wheel. The exhaust system member is in an area on the vehicle-width-direction outer side of the frame member and on the front side of the hinge pillar.

9 Claims, 7 Drawing Sheets

(56) References Cited

U.S. PATENT DOCUMENTS

| | | | |
|---|---|---|---|
| 2018/0072352 A1* | 3/2018 | Shimoda | B62D 21/157 |
| 2019/0210452 A1* | 7/2019 | Kato | B62D 25/20 |
| 2020/0047808 A1* | 2/2020 | Ajisaka | B60K 15/063 |
| 2021/0061131 A1* | 3/2021 | Katayama | B60L 50/64 |
| 2021/0094488 A1* | 4/2021 | Kobayashi | B60K 6/24 |
| 2021/0276413 A1* | 9/2021 | Shimanaka | B62D 25/025 |
| 2021/0276625 A1* | 9/2021 | Shimanaka | B62D 25/04 |
| 2021/0276626 A1* | 9/2021 | Shimanaka | F01N 1/00 |
| 2021/0276627 A1* | 9/2021 | Shimanaka | B60K 13/04 |
| 2021/0300168 A1* | 9/2021 | Kohara | B60K 1/04 |

\* cited by examiner

SIDE VEHICLE BODY STRUCTURE OF VEHICLE

TECHNICAL FIELD

The present disclosure relates to a side vehicle body structure of a vehicle which includes, for example, an internal combustion engine equipped on the front side of a partition wall defining a front edge of a vehicle cabin space, an exhaust apparatus through which exhaust gas exhausted from the internal combustion engine passes, a vehicle body structure extending along the vehicle front-rear direction on the side of a floor forming a floor surface of the vehicle cabin space, and a pillar extending in the vehicle up-down direction from the vehicle body structure.

BACKGROUND ART

In a vehicle, a structure has been known in which at least a part of an exhaust system member (for example, a filter for exhaust treatment, an exhaust pipe, or a silencer) forming an exhaust apparatus is provided not at the vehicle-width-direction center under a floor but on the vehicle-width-direction outer side relative to the floor (i.e., a lower portion of the vehicle on the vehicle-width-direction outer side).

The aim of adopting such a configuration is roughly classified into cases where a vehicle body layout property is desired and where motion performance of a vehicle body is emphasized. In the former case, for example, in a vehicle adopting a system using an internal combustion engine and a motor in combination as in a hybrid car or a range extender car, a vehicle has been known in which, for example, in order to avoid a battery disposed under a floor, an exhaust system member is provided on the vehicle-width-direction outer side relative to the battery under the floor (for example, see Japanese Patent Laid-Open No. 2018-39452). In the latter case, a vehicle has been known in which, for example, as in a sports car, in order to dispose a heavy object near the center of a vehicle body, an exhaust system member, which is relatively light, is disposed at a lower portion of the vehicle on the vehicle-width-direction outer side.

Here, as an example in which the heavy object is disposed near the center of the vehicle body, the center of gravity of occupants seated on a driver seat and a passenger seat is lowered, or an interval in the vehicle width direction between the driver seat and the passenger seat which are adjacent to each other is narrowed.

On the other hand, as a specific example in which the exhaust system member is disposed at the lower portion of the vehicle on the vehicle-width-direction outer side, it is conceivable to lay out the exhaust system member in the vicinity of the vehicle-width-direction outer side of a vehicle body structure provided on the side of a floor.

However, in a case where the exhaust system member, which is relatively light, is laid out on the outer side of the vehicle body structure provided on the side of the floor, a problem occurs in which the width of the vehicle disadvantageously expands by a width corresponding to that of the exhaust system member. Thus, in a case where the exhaust system member, which is relatively light, is laid out on the outer side of the vehicle body structure with even more emphasis on the motion performance of the vehicle, there is room for improvement in the design.

SUMMARY

The present disclosure has been made in view of such a problem and provides a side vehicle body structure of a vehicle which can, even in a case where an exhaust apparatus (at least one of an exhaust member and an exhaust pipe) is provided on the vehicle-width-direction outer side of a vehicle body structure provided on the side of a floor, avoid widening of the vehicle.

The present disclosure is a side vehicle body structure of a vehicle which includes an internal combustion engine equipped on the front side of a partition wall defining a front edge of a vehicle cabin space, an exhaust apparatus through which exhaust gas from the internal combustion engine passes, a vehicle body structure extending along the vehicle front-rear direction on the side of a floor forming a floor surface of the vehicle cabin space, and a pillar extending in the vehicle up-down direction from the vehicle body structure, wherein a frame member is provided which extends toward the vehicle front side from the pillar and has a front end, on the rear side of a wheel of the vehicle, overlapping with a vehicle-width-direction length area of the wheel, and the exhaust apparatus is provided in an area on the vehicle-width-direction outer side of the frame member and on the front side of the pillar.

According to this configuration, the exhaust apparatus is provided by using a dead space provided in the area on the vehicle-width-direction outer side of the frame member and on the front side of the pillar, so that widening of the vehicle is avoided, and motion performance of the vehicle can be enhanced. Moreover, at the time of a small overlap collision, entering of the receding wheel into the vehicle cabin space can be prevented by the frame member.

Accordingly, even in a case where the exhaust apparatus is provided on the vehicle-width-direction outer side relative to the vehicle body structure, widening of the vehicle can be avoided, and a collision resistance performance at the time of a small overlap collision can be ensured.

Here, as the exhaust apparatus, for example, not limited to an exhaust system member, which will be described later, at least one of the exhaust system member and the exhaust pipe, which will be described later, can be disposed in the area on the vehicle-width-direction outer side of the frame member and on the front side of the pillar.

In an aspect of the present disclosure, the exhaust apparatus has an exhaust pipe and an exhaust system member, and the exhaust system member is provided in the area on the vehicle-width-direction outer side of the frame member and on the front side of the pillar. According to this configuration, even in a case where the exhaust system member is provided on the vehicle-width-direction outer side relative to the vehicle body structure, widening of the vehicle can be avoided, and the collision resistance performance at the time of a small overlap collision can be ensured.

Here, as long as the exhaust system member is a member through which exhaust gas exhausted from the internal combustion engine passes, the exhaust system member is not limited to a member such as a GPF including, for example, a filter that treats exhaust gas (gas) from the internal combustion engine and may be, for example, a member having a silencing function such as a silencer or a catalyzer. Furthermore, the exhaust system member may include a portion (component) including a connection function for connecting to another exhaust system member or the exhaust pipe.

In another aspect of the present disclosure, below the frame member, the exhaust pipe is routed which connects the internal combustion engine provided on the inner side of the frame member in the vehicle width direction and the exhaust system member provided on the outer side of the frame member in the vehicle width direction. According to this configuration, it is possible to achieve both, at the time of a small overlap collision, providing performance of the frame member in which entering of the receding wheel into a cabin is avoided, and providing routing space of the exhaust pipe connecting the internal combustion engine and the exhaust system member.

In a further aspect of the present disclosure, in the vehicle body structure, a portion overlapping with the exhaust system member in a vehicle front view is located on the vehicle rear side relative to the exhaust system member. According to this configuration, the exhaust system member, while being disposed in a layout in which the exhaust system member overlaps with the vehicle body structure in the vehicle width direction, can be disposed in the dead space without mutual interference. Accordingly, the dead space can be utilized effectively.

In a still further aspect of the present disclosure, the vehicle body structure includes a front extending portion extending toward the vehicle front side up to at least immediately under the exhaust system member. According to this configuration, the exhaust system member can be disposed in the dead space so as to be supported by the front extending portion of the vehicle body structure in a state of being disposed in the dead space.

According to the disclosed configuration, even in a case where the exhaust system member is provided on the vehicle-width-direction outer side relative to the vehicle body structure, widening of the vehicle can be avoided, and the collision resistance performance at the time of a small overlap collision can be ensured.

DETAILED DESCRIPTION

An embodiment of the present disclosure will be explained with reference to the following drawings. A vehicle of the present embodiment is a sports car adopting a so-called space frame structure coupling a plurality of extruded frames made of an aluminum alloy and forming a vehicle body framework, and adopting a center pillar-less structure in which a side door is of a two-door type. A side vehicle body structure of such a vehicle will be explained with reference to FIGS. 1 to 7.

In order to clarify illustration, in the figures, illustration of a front suspension and a rear suspension is omitted, and detailed illustration of a suspension support member supporting these suspensions, which will be described later, is omitted. In the figures, arrow F indicates the vehicle front direction; arrow R, the vehicle right direction; arrow L, the vehicle left direction; arrow U, the vehicle upper direction.

Figure 1:
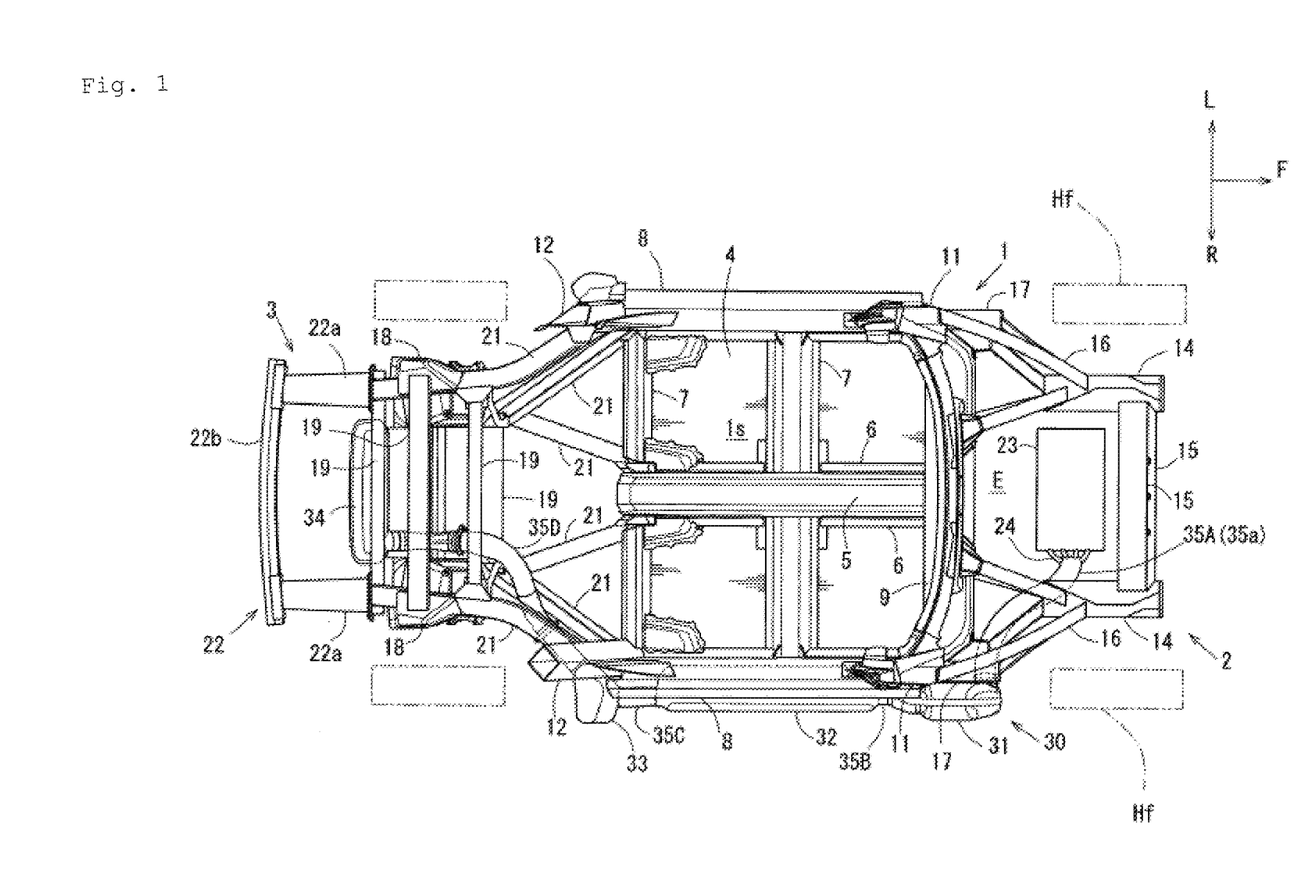
FIG. 1 is a plan view illustrating a main portion of a vehicle including a side vehicle body structure of the present embodiment.
Figure 2:
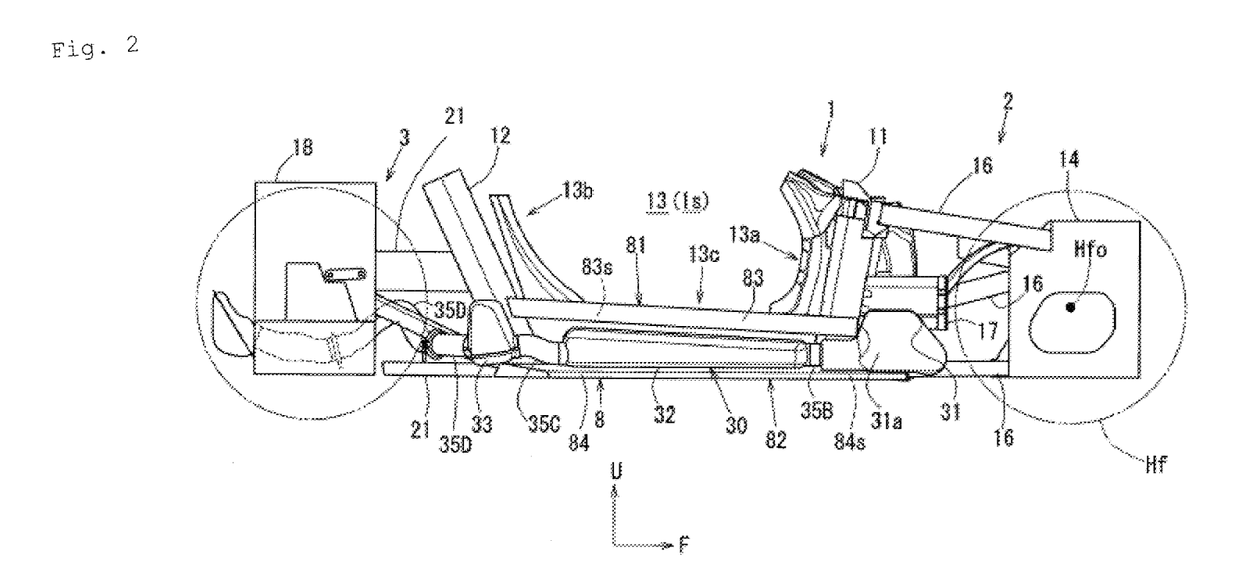
FIG. 2 is a left side view illustrating the main portion of the vehicle including the side vehicle body structure of the present embodiment.

As illustrated in FIGS. 1 and 2, the vehicle including the side vehicle body structure of the present embodiment includes a vehicle cabin 1 for an occupant to get in, a front vehicle body 2 provided on the vehicle front side relative to the vehicle cabin 1, and a rear vehicle body 3 provided on the vehicle rear side relative to the vehicle cabin 1. As illustrated in FIG. 1, the vehicle cabin 1 and the front vehicle body 2 are partitioned by a dash panel 9 in a raised wall shape. The dash panel 9 serves as a partition wall defining a front edge of a vehicle cabin space is provided inside the vehicle cabin 1 and is disposed between the vehicle cabin 1 and the front vehicle body 2.

As illustrated in FIG. 1, the vehicle cabin 1 includes a floor panel 4 forming a floor (floor surface) of the vehicle cabin 1, a tunnel frame 5 extending in the vehicle front-rear direction above a center position of the floor panel 4 in the vehicle width direction, a tunnel side frame 6 extending in the vehicle front-rear direction at a corner between a side wall on each of both sides of the tunnel frame 5 and the floor panel 4, and a plurality of floor cross members 7 each coupling the tunnel frame 5 and a side sill 8 in the vehicle width direction.

As illustrated in FIGS. 1 and 2, both sides of the floor panel 4 of the vehicle cabin 1 in the vehicle width direction include the pair of left and right side sills 8 extending in the vehicle front-rear direction, hinge pillars 11 (front-side pillars) each extending upward from a front end of the side sill 8, and rear pillars 12 (rear-side pillars) each extending upward from a rear end of the side sill 8.

As illustrated in FIG. 2, on the above-described both sides of the vehicle cabin 1, door openings 13 through which the occupant enters and exits the vehicle cabin 1 are provided. A hinge pillar 11, a rear pillar 12, and the side sill 8 are provided along a front edge 13a, rear edge 13b, and lower edge 13c of the door opening 13, respectively.

As illustrated in FIGS. 1 and 2, the front vehicle body 2 includes a pair of left and right front suspension support members 14 supporting a front suspension (illustration omitted), a plurality of front-side cross members 15 (see FIG. 1) each coupling the pair of left and right front suspension support members 14 in the vehicle width direction, a plurality of front-side coupling frames 16 each coupling the vehicle cabin 1 and the front suspension support member 14, and a front shock absorption structure (illustration omitted) that absorbs a shock load from the vehicle front side.

As illustrated in FIG. 1, the front suspension support member 14 is located on the vehicle-width-direction inner side of the side sill 8 corresponding to each of the left and right sides and pivotally supports a front wheel Hf via the front suspension, which is not illustrated. The front wheel Hf is provided on the vehicle front side relative to the front end of the side sill 8 and on the vehicle-width-direction outer side relative to the front suspension support member 14. The front suspension support member 14 is manufactured by, for example, die cast molding of an aluminum alloy. Furthermore, as illustrated in FIGS. 1 and 2, the front vehicle body 2 includes, at a position spaced apart rearward from the front wheel Hf, a tire stopper frame 17 extending toward the vehicle front side from a front portion of the hinge pillar 11.

Although illustration is omitted, the front shock absorption structure includes a crash can formed of, for example, a cylindrical body extending in the vehicle front-rear direction from the front end side of the front suspension support member 14, and a bumper reinforcement extending in the vehicle width direction so as to couple front ends of the pair of left and right crash cans.

The rear vehicle body 3 includes a pair of left and right rear suspension support members 18 supporting a rear suspension, a plurality of rear-side cross members 19 (see FIG. 1) each coupling the pair of left and right rear suspension support members 18 in the vehicle width direction, a plurality of rear-side coupling frames 21 each coupling the vehicle cabin 1 and the rear suspension support member 18, and a rear shock absorption structure 22 that absorbs a shock load from the vehicle rear side. Illustration of not only the above-described front shock absorption structure but also the rear shock absorption structure 22 is omitted in FIG. 2.

As illustrated in FIG. 1, the rear shock absorption structure 22 includes a crash can 22*a* formed of, for example, a cylindrical body extending toward the vehicle rear side from the rear end side of the rear suspension support member 18, and a bumper reinforcement 22*b* extending in the vehicle width direction so as to couple rear ends of the pair of left and right crash cans 22*a*. As also illustrated in FIG. 1, in a front portion of the vehicle of the present embodiment, an area between the pair of left and right front suspension support members 14 is formed as an engine room E, and the engine room E is equipped with an engine 23.

An exhaust apparatus 30 (exhaust unit) is connected to an exhaust port provided on the side wall side of this engine 23, via an exhaust manifold 24. The exhaust apparatus 30 includes, as exhaust system members, a GPF 31 (gasoline particulate filter), a first pre-silencer 32, a second pre-silencer 33, a main silencer 34, and a tail pipe (illustration omitted). The exhaust manifold 24 and the GPF 31 are connected by a connection part 35A, the above-described exhaust system members 31 and 32 are connected by a connection part 35B, the above-described exhaust system members 32 and 33 are connected by a connection part 35C, and the above-described exhaust system members 33 and 34 are connected by a connection part 35D. The GPF 31 has a body 31*a* including a filter 31*aa* that, as an exhaust treatment device that treats exhaust gas of the engine 23, collects a particulate matter (PM) included in the exhaust gas. Each of the silencers (the first pre-silencer 32, the second pre-silencer 33, and the main silencer 34) reduces a sound when the exhaust gas is released to the atmosphere.

Although the connection parts 35A, 35B, 35C, and 35D are formed by mainly an exhaust pipe 35*a*, the connection parts 35A, 35B, 35C, and 35D are provided at, as exhaust system members, the GPF 31, the silencers 32, 33, and 34, and the like and also formed to include the exhaust pipe 35*a* and connection portions having a function of connecting to the other exhaust system members 31, 32, 33, and 34. Each of the connection parts 35A, 35B, 35C, and 35D, not limited to formation including both the exhaust pipe 35*a* and the connection portion provided in the exhaust system member, can be formed by at least one of these.

In the exhaust apparatus 30, the GPF 31, the first pre-silencer 32, the second pre-silencer 33, and the main silencer 34 are each routed along an exhaust path extending rearward from the front side of the vehicle body via the connection part. In this example, the exhaust apparatus 30 is routed along an exhaust path such that the exhaust path bypasses the vehicle-width-direction outer side (the vehicle right side, in this example) in the middle of extending toward the vehicle rear side. Specifically, the exhaust apparatus 30 is routed in the front vehicle body 2 from, in the vehicle width direction, the inner side equipped with the engine 23 toward the outer side and routed toward the vehicle rear side along a side portion of the vehicle cabin 1, and the exhaust apparatus 30 is routed again in the rear vehicle body 3 from the vehicle-width-direction outer side toward the inner side and routed toward the vehicle rear side.

Thus, the exhaust system member, which is relatively light, is laid out on the vehicle-width-direction outer side, so that a heavy object can be laid out at the vehicle center relative to the exhaust system member, consequently contributing to enhancement of a motion performance of the vehicle.

Hereinafter, the vehicle body side structure of the present embodiment will be explained in more detail with reference to FIGS. 3A to 7, in addition to FIGS. 1 and 2.

Figure 3A:
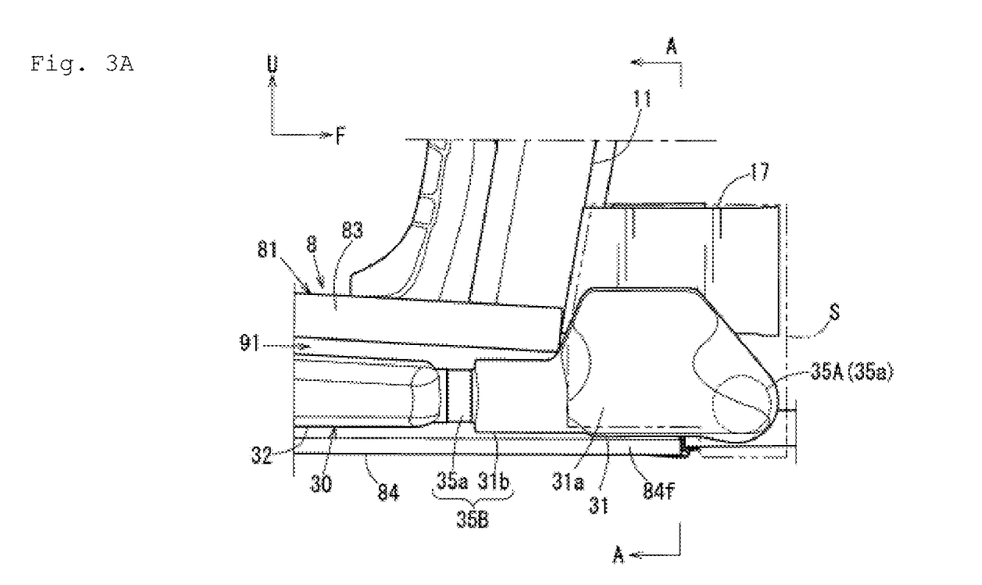
FIG. 3A is a side view illustrating a front portion of the side vehicle body structure of the present embodiment.
Figure 3B:
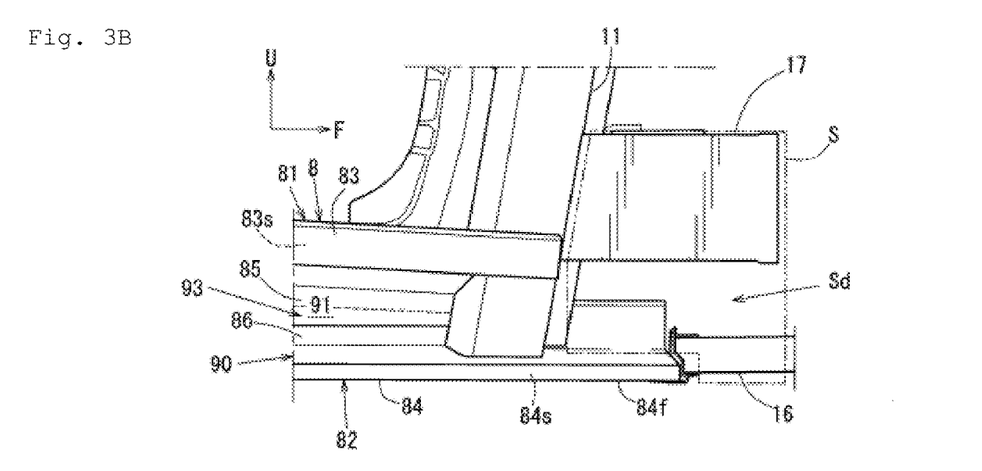
FIG. 3B is a left side view illustrated with an exhaust system member removed from FIG. 3A.

As illustrated in FIGS. 2 and 3B, the side sill 8 is configured with a two-divided structure including a side sill upper 81 and a side sill lower 82 on the upper and lower sides. The side sill upper 81 and the side sill lower 82 are both frame members each formed by extrusion of an aluminum alloy material as described above, and respectively have closed cross-sectional spaces 83*s* and 84*s* inside which extend over the full length in the vehicle front-rear direction.

The side sill upper 81 is formed by integrating a closed cross-section portion 83 (hereinafter also referred to as the "upper-side closed cross-section portion 83") having the closed cross-sectional space 83*a* inside, and a lower flange 85 extending downward from a vehicle-width-direction inner end of the upper-side closed cross-section portion 83 and a lower end thereof (see FIG. 3B). Further, as illustrated in the same figure, the side sill lower 82 is formed by integrating a closed cross-section portion 84 (hereinafter also referred to as the "lower-side closed cross-section portion 84") having the closed cross-sectional space 84*s* inside, and an upper flange 86 extending upward from the vehicle-width-direction inner side of the lower-side closed cross-section portion 84 and an upper end thereof.

As illustrated in FIG. 2, the upper-side closed cross-section portion 83 and the lower-side closed cross-section portion 84 both extend in the vehicle front-rear direction so as to overlap with the pillars 11 and 12 on the front and rear sides in a vehicle side view. The side sill lower 82 of the present embodiment extends over the full length of the side sill 8 in the vehicle front-rear direction.

As also illustrated in FIG. 2, the upper-side closed cross-section portion 83 and the lower-side closed cross-section portion 84 are both formed to be longer in the vehicle width direction than the pillars 11 and 12 on the front and rear sides. The upper-side closed cross-section portion 83 and the lower-side closed cross-section portion 84 in the present embodiment are both formed so that outer ends thereof in the vehicle width direction project toward the vehicle-width-direction outer side relative to vehicle-width-direction outer faces of the pillars 11 and 12 on the front and rear sides.

Further, on the vehicle-width-direction outer side relative to the upper-side closed cross-section portion 83 of the side sill upper 81, an eaves 87 is provided which extends in a flange shape outward in the vehicle width direction and downward from a vehicle-width-direction outer end of the upper-side closed cross-section portion 83 and covers the first pre-silencer 32 as an exhaust system member, which will be described later, from above (see FIG. 7).

As illustrated in FIG. 3B, in the above-described side sill upper 81 and side sill lower 82, the lower flange 85 and the upper flange 86 overlap with each other in a vehicle side view (in the vehicle up-down direction and the vehicle front-rear direction) and are welded to each other at this overlapping portion 93. As described above, in the side sill 8, the lower flange 85 and the upper flange 86 can be integrated by welding the mutually overlapping portion 93, forming a coupling wall 90 coupling vehicle-width-direction inner ends of the upper-side closed cross-section portion 83 and the lower-side closed cross-section portion 84 in the up-down direction. Thereby, the side sill 8 is configured so that the closed cross-section portion 83 of the side sill upper 81 and the closed cross-section portion 84 of the side sill lower 82 are disposed so as to be spaced apart from each other in the up-down direction via the coupling wall 90 and, between these closed cross-section portions 83 and 84 on the upper and lower sides and the coupling wall 90, a recess 91 is provided which opens toward the vehicle-width-direction outer side.

Figure 4:
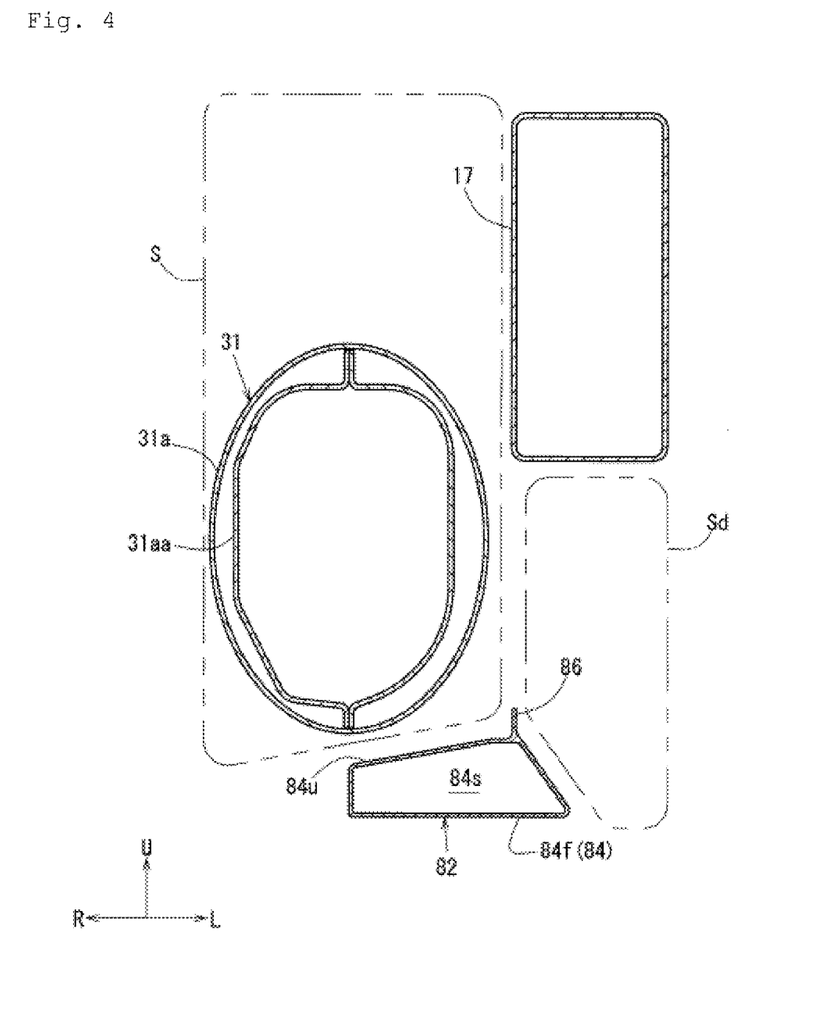
FIG. 4 is a cross-sectional view taken along line A-A in FIG. 3A.

The above-described side sill 8 and pillars 11 and 12 on the front and rear sides are integrally joined by arc welding (MIG welding, in this example). Specifically, as illustrated in FIGS. 3B and 5B, the upper-side closed cross-section portion 83 and the lower-side closed cross-section portion 84 in the present embodiment both extend in the vehicle front-rear direction so as to overlap with the hinge pillar 11 in the vehicle front-rear direction. In this example, in the upper-side closed cross-section portion 83, a front end extends up to substantially the same position as a front end of the hinge pillar 11 in the vehicle front-rear direction. On the other hand, as illustrated in FIGS. 3B, 4, and 5B, the lower-side closed cross-section portion 84 includes a front extending portion 84f extending toward the vehicle front side relative to each of the front ends of the upper-side closed cross-section portion 83 and the hinge pillar 11 in the vehicle front-rear direction, and is integrally formed with the front extending portion 84f. The front extending portion 84f extends toward the vehicle front side until a front end thereof is located on the vehicle rear side relative to a front end of the tire stopper frame 17.

Further, as illustrated in the same figures, at a front portion of the side sill 8, the hinge pillar 11 is provided to protrude at the lower-side closed cross-section portion 84 in such a manner that the hinge pillar 11 projects toward the vehicle upper side from a vehicle-width-direction inner-side portion of the upper-side closed cross-section portion 83, in a posture inclined so as to be located on the vehicle front side toward the vehicle upper side. The hinge pillar 11 is an extruded member made of an aluminum alloy which is extruded in a rectangular shape in which a cross section orthogonal to the longitudinal direction inside forms a closed cross-section.

In the hinge pillar 11 as described above, a portion facing each of the upper-side closed cross-section portion 83, the coupling wall 90, and the lower-side closed cross-section portion 84 is integrally joined thereto by arc welding or the like.

As illustrated in FIGS. 1 and 2, at a rear portion of the side sill 8, the rear pillar 12 is provided to protrude in a columnar shape at the lower-side closed cross-section portion 84 in such a manner that the rear pillar 12 projects toward the vehicle upper side from the vehicle-width-direction inner-side portion of the upper-side closed cross-section portion 83, in a posture inclined so as to be located on the vehicle rear side toward the vehicle upper side. Furthermore, the rear pillar 12 is an extruded member made of an aluminum alloy which is extruded in a rectangular shape in which a cross section orthogonal to the longitudinal direction inside forms a closed cross-section.

In the rear pillar 12 as described above, a portion facing each of the upper-side closed cross-section portion 83, the coupling wall 90, and the lower-side closed cross-section portion 84 is integrally joined thereto by arc welding or the like.

Further, the above-described tire stopper frame 17 is also referred to as a reinforcement for small overlap collision resistance (reinforcement for SORB) and is a frame for receiving the front wheel Hf (see FIGS. 1 and 2) receding at the time of a small overlap collision, and suppressing entering of the front wheel Hf into the vehicle cabin 1. As illustrated in FIGS. 1, 2, 3B, 5B, and 7, the tire stopper frame 17 has a rear end joined to a front face of the hinge pillar 11, and a front end horizontally extending in the vehicle front-rear direction up to a position in front of a rearmost end of the front wheel Hf. Thereby, in the tire stopper frame 17, the front end is disposed at a position spaced apart toward the vehicle rear side from the rearmost end of the front wheel Hf (see FIGS. 1 and 2). As illustrated in FIG. 4, the tire stopper frame 17 is formed by extrusion in such a manner that a cross section thereof which is orthogonal to the vehicle front-rear direction is formed in a closed cross-sectional shape.

Further, as illustrated in FIG. 2, the tire stopper frame 17 is provided in such a manner that the front end thereof overlaps with a vehicle-width-direction length area of the front wheel Hf in the vehicle width direction so as to be capable of reliably receiving the receding front wheel Hf (see FIG. 1). In this example, the tire stopper frame 17 is provided in such a manner that the front end thereof is located slightly near the vehicle-width-direction inner side relative to a center (center of gravity) position of the front wheel Hf in the vehicle width direction in a range of overlapping with the vehicle-width-direction length area of the front wheel Hf in the vehicle width direction, so that the front end thereof, while receiving the receding front wheel Hf, can cause the front wheel Hf to move toward the vehicle-width-direction outer side.

As described above, the tire stopper frame 17 is provided slightly near the vehicle-width-direction inner side relative to the center (center of gravity) position of the front wheel Hf in the vehicle width direction, so that the vehicle-width-direction outer side of the tire stopper frame 17 and the front side of the upper-side closed cross-section portion 83 of the side sill 8 have a space having a shape recessed, in a plan view, toward the vehicle-width-direction inner side and rearward in the vehicle front-rear direction, a so-called dead space S.

Specifically, as illustrated in FIGS. 3B, 4, 5B, 6, and 7, the dead space S is provided on the vehicle front side relative to the front end of the hinge pillar 11, and between the tire stopper frame 17 and an outer-side panel (illustration omitted) such as a fender panel (illustration omitted) located on the vehicle-width-direction outer side relative to the tire stopper frame 17 and forming a design face of a side portion of the front vehicle body 2.

Figure 7:
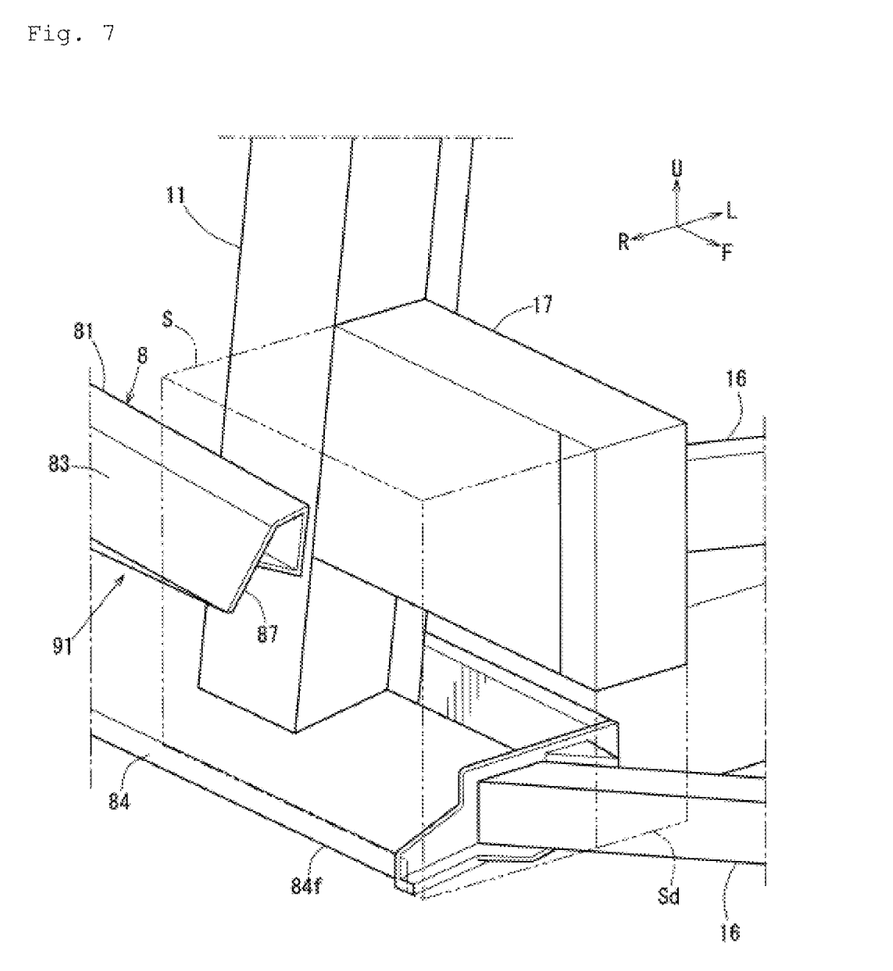
FIG. 7 is a perspective view illustrated with the exhaust system member removed from FIG. 6.

As illustrated in FIGS. 4, 5B, and 7, the front extending portion 84f provided at a front portion of the lower-side closed cross-section portion 84 of the side sill 8 extends toward the vehicle front side up to below the dead space S.

As illustrated in FIG. 2, the tire stopper frame 17 is provided in such a manner that the center of the front end thereof in the up-down direction is located at the same height as a center Hfo (center of gravity) of the front wheel Hf in a vehicle side view or at around the height so that the front end thereof can reliably receive the receding front wheel Hf. In other words, in this example, as illustrated in FIG. 4, the tire stopper frame 17 is joined to the front face of the hinge pillar 11 at a higher position than an upper wall 84u of the front extending portion 84f of the side sill 8. Thus, a space Sd (a gap in the vehicle up-down direction) is provided below the tire stopper frame 17 horizontally extending toward the vehicle front side from the front face of the hinge pillar 11, namely, as illustrated in FIGS. 3B, 4, and 7, below the tire stopper frame 17 in a vehicle side view.

As illustrated in FIGS. 1 and 2, in the exhaust apparatus 30, each of the GPF 31, the first pre-silencer 32, and the second pre-silencer 33 is disposed in this order toward the vehicle rear side along a lower portion of a vehicle body side portion (a vehicle right-side portion, in this example). Specifically, as illustrated in FIGS. 3B and 4, the GPF 31 includes the body 31a in which the filter 31aa is incorporated, and a connection portion 31b formed to have a smaller width than the body 31a. In the GPF 31, the body 31a is mainly disposed in such a manner that at least a part of the body 31a is accommodated in a vehicle body lower portion, on the vehicle front side relative to the hinge pillar 11 and on the vehicle-width-direction outer side relative to the tire stopper frame 17, namely in the above-described dead space S.

Furthermore, the above-described front extending portion 84f provided at the front portion of the lower-side closed cross-section portion 84 of the side sill 8 extends forward relative to a position corresponding to the front end of the hinge pillar 11 in the vehicle front-rear direction. That is, the front extending portion 84f extends up to immediately under the GPF 31 disposed in the dead space S. The GPF 31 is supported so as to be placed on a top face of the front extending portion 84f (see FIG. 4).

Figure 5A:
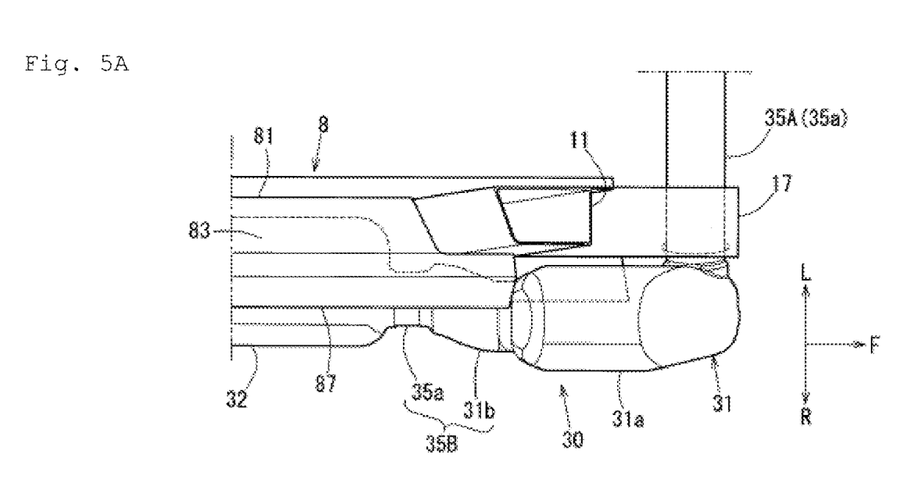
FIG. 5A is a plan view illustrating the front portion of the side vehicle body structure of the present embodiment.
Figure 5B:
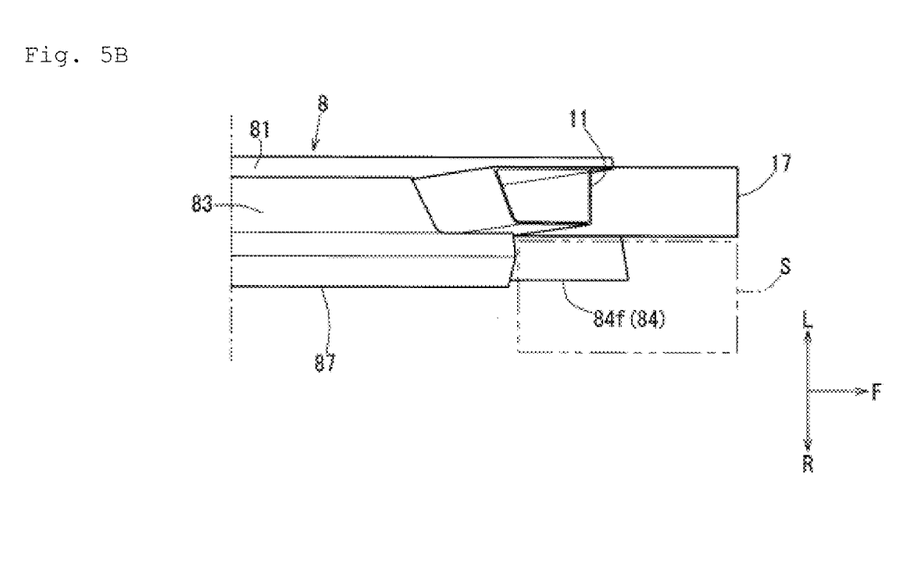
FIG. 5B is a plan view illustrated with the exhaust system member removed from FIG. 5A.

As illustrated in FIGS. 1 and 5A, the body 31a of the GPF 31 and the engine 23 (exhaust manifold 24) provided on the vehicle-width-direction inner side relative to the body 31a are connected by the connection part 35A (hereinafter referred to as the "first connection part 35A") extending in the vehicle width direction between these. The first connection part 35A is formed by the exhaust pipe 35a provided as a part of the exhaust apparatus 30. Furthermore, in a vehicle plan view, the tire stopper frame 17 intervenes between the GPF 31 and the engine 23, while the first connection part 35A extends in the vehicle width direction across the space Sd (see FIGS. 4 and 6) provided below the tire stopper frame 17 (see FIGS. 5 and 6).

As illustrated in FIGS. 1 and 2, the first pre-silencer 32 is formed to have a long length in the vehicle front-rear direction along the side sill 8 provided at the lower edge 13c of the door opening 13. The first pre-silencer 32 is formed to have substantially a constant length in the vehicle width direction over the full length in the vehicle front-rear direction and formed in a vehicle side view shape in which the first pre-silencer 32 is inclined so as to become gradually higher toward the vehicle rear side.

The first pre-silencer 32 as described above is disposed on the vehicle-width-direction outer side relative to a vehicle-width-direction inner end of the side sill 8 in such a manner that at least a part of the first pre-silencer 32 in the vehicle width direction overlaps with the side sill 8. That is, the entire first pre-silencer 32 except for an outer-side portion thereof in the vehicle width direction is accommodated in the recess 91 of the side sill 8 over the full length of the vehicle front-rear direction (see FIG. 2).

Figure 6:
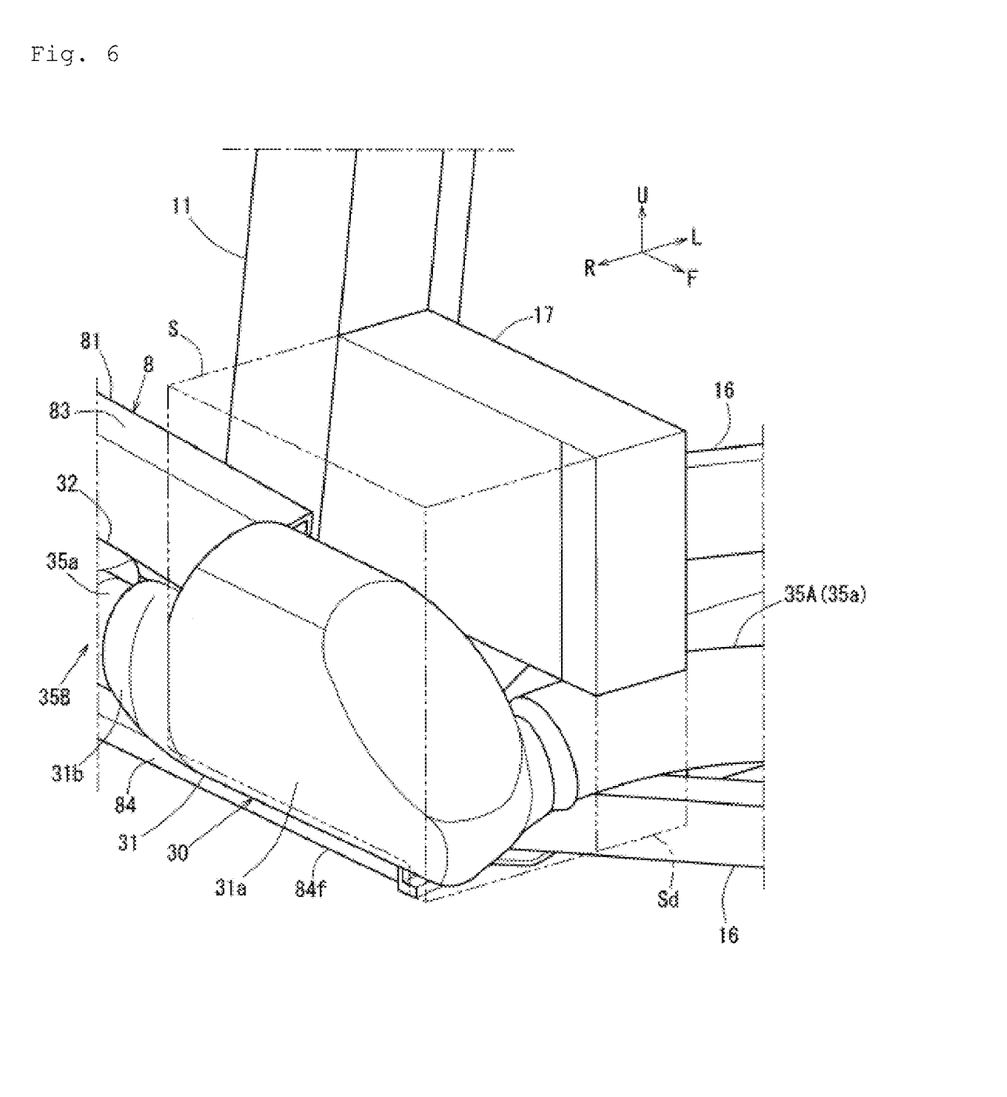
FIG. 6 is a perspective view of the front portion of the side vehicle body structure of the present embodiment as viewed from the vehicle-width-direction outer side and the upper and front side.

As illustrated in FIGS. 3A, 5A, and 6, the GPF 31 disposed on the vehicle front side of the hinge pillar 11 and the first pre-silencer 32 disposed on the vehicle rear side thereof are connected by the connection part 35B (hereinafter referred to as the "second connection part 35B").

Further, as illustrated in FIGS. 1 and 2, the second pre-silencer 33 is disposed at a portion going around, with respect to the rear pillar 12, from forward to rearward and from the outer side to the inner side in the vehicle width direction. The second pre-silencer 33 as described above is connected to the connection part 35C (also referred to as the "third connection part 35C") connecting to the first pre-silencer 32 provided on the vehicle front side at a front end portion of the body 33a, and is connected to the connection part 35D (also referred to as the "fourth connection part 35D") connecting to the main silencer 34 (see FIG. 1) provided at the vehicle-width-direction center and on the vehicle rear side, on the vehicle-width-direction inner side of the body 33a and at a vehicle rear portion.

As illustrated in FIGS. 1 and 2, the above-described side vehicle body structure of the vehicle in the present embodiment is a side vehicle body structure of a vehicle which includes the engine 23 (internal combustion engine) (see FIG. 1) equipped on the front side of the dash panel 9 (partition wall) defining the front edge of the vehicle cabin space 1s, the exhaust apparatus 30 through which exhaust gas exhausted from the engine 23 passes, the side sill 8 (vehicle body structure) extending along the vehicle front-rear direction on the side of the floor panel (floor) forming the floor surface of the vehicle cabin space 1s, and the hinge pillar 11 (pillar) extending in the vehicle up-down direction from the side sill 8, wherein, the tire stopper frame 17 as a frame member is provided which, as illustrated in FIGS. 1, 2, 3A and 3B, 4, 5A and 5B, 6, and 7, extends toward the vehicle front side from the hinge pillar 11 and, as illustrated particularly in FIG. 1, has a front end, on the rear side of the front wheel Hf (wheel) of the vehicle, overlapping with the vehicle-width-direction length area of the front wheel Hf, and, as illustrated in FIGS. 3A, 4, 5A, and 6, the GPF 31 (the exhaust system member provided in the exhaust apparatus 30) is provided in an area on the vehicle-width-direction outer side of the tire stopper frame 17 and on the front side of the hinge pillar 11.

According to this configuration, the GPF 31 can be provided by using the dead space S provided in the area on the vehicle-width-direction outer side of the tire stopper frame 17 and on the front side of the hinge pillar 11, and while performance is enhanced by the tire stopper frame 17 in which, at the time of a small overlap collision, entering of the receding front wheel Hf into the vehicle cabin space of the vehicle cabin 1 is avoided, widening of the vehicle can also be avoided.

In particular, widening of the vehicle is avoided, so that, while the GPF 31, which is light, is laid out on the vehicle-width-direction outer side, a heavy object can be laid out at the vehicle center, thus contributing to enhancement of motion performance of the vehicle.

The fact that entering of the receding front wheel Hf into the vehicle cabin space of the vehicle cabin 1 is avoided indicates that, at the time of a small overlap collision, the entering of the receding front wheel Hf into the vehicle cabin space is avoided because the tire stopper frame 17 displaces (moves) the front wheel Hf toward the vehicle-width-direction outer side while receiving the front wheel Hf.

In an aspect of the present disclosure, as illustrated in FIGS. 1, 3B, 4, and 7, in the space Sd below the tire stopper frame 17, the exhaust pipe 35a connecting the engine 23 provided on the inner side of the tire stopper frame 17 in the vehicle width direction and the GPF 31 provided on the outer side of the tire stopper frame 17 in the vehicle width direction, namely, the first connection part 35A, is routed.

In the present embodiment, the tire stopper frame 17 is disposed at a position at around the height of the center Hfo (center of gravity) (see FIG. 2) of the front wheel Hf, on the rear side of the front wheel Hf, in the vehicle up-down direction. Thereby, at the time of a small overlap collision, the tire stopper frame 17 abuts against the vicinity of, in a vehicle side view, the center Hfo (center of gravity) of the receding front wheel Hf and thus can effectively receive the front wheel Hf. That is, at the time of small overlap collision, the performance in which entering of the receding front wheel Hf into the vehicle cabin space of the vehicle cabin 1 is avoided can be enhanced by the tire stopper frame 17.

On the other hand, the tire stopper frame 17 is, in the vehicle up-down direction, formed so as to keep the necessary minimum size (the length in the vehicle up-down direction) within a range of being capable of receiving the vicinity of, in a vehicle side view, the center Hfo of the receding front wheel Hf. Thus, the space Sd is secured below the tire stopper frame 17, and the space Sd can be used as a routing space of the first connection part 35A formed by, for example, the exhaust pipe 35a connecting the engine 23 and the GPF 31.

Accordingly, in the present embodiment, it is possible to achieve both, at the time of a small overlap collision, ensuring of the performance of the tire stopper frame 17 in which entering of the receding front wheel Hf into the vehicle cabin space of the vehicle cabin 1 is avoided, and providing of the routing space of the first connection part 35A connecting the engine 23 and the GPF 31.

In another aspect of the present disclosure, as illustrated in FIGS. 2, 3A, 5A, and 6, in the side sill 8, a portion overlapping with the GPF 31 in a vehicle front view is located on the vehicle rear side relative to the GPF 31. Specifically, in the side sill 8, for example, the upper-side closed cross-section portion 83 has the front end located on the vehicle rear side relative to a rear end of the body 31a of the GPF 31. According to this configuration, the GPF 31, while being disposed in a layout in which the GPF 31 overlaps with the side sill 8 in the vehicle width direction, can be disposed in the dead space S without mutual interference. Accordingly, the dead space S can be utilized effectively.

In a further aspect of the present disclosure, as illustrated in FIGS. 2, 3A, and 4, the lower-side closed cross-section portion 84 of the side sill 8 includes the front extending portion 84f extending toward the vehicle front side up to at least immediately under the GPF 31. According to this configuration, the GPF 31 can be disposed in the dead space S so as to be placed (supported) on the top face of the front extending portion 84f provided in the pedestal-shaped lower-side closed cross-section portion 84 of the side sill 8.

The present disclosure is not limited to only the configurations of the above-described embodiment and can be formed in various embodiments. For example, although in the above-described embodiment, the embodiment has been explained in which the GPF 31 (the exhaust system member provided in the exhaust apparatus 30) is disposed in the dead space S, the present disclosure is not limited to this embodiment, and the other exhaust system members 31, 33, and 34 or only the exhaust pipe 35a may be disposed in the dead space S.

What is claimed is:

1. A side vehicle body structure of a vehicle, comprising:
an internal combustion engine equipped on a front side of a partition wall defining a front edge of a vehicle cabin space;
an exhaust apparatus through which exhaust gas from the internal combustion engine passes;
a vehicle body structure extending along a vehicle front-rear direction on a side of a floor forming a floor surface of the vehicle cabin space;
a pillar extending in a vehicle up-down direction from the vehicle body structure; and
a frame member extending toward a vehicle front side from the pillar and having a front end, on a rear side of a wheel of the vehicle, overlapping with a vehicle-width-direction length area of the wheel;
wherein the exhaust apparatus is located in an area on a vehicle-width-direction outer side of the frame member and on a front side of the pillar.

2. The side vehicle body structure of a vehicle according to claim 1,
wherein the exhaust apparatus comprises an exhaust pipe and an exhaust system member, and
the exhaust system member is located in the area on the vehicle-width-direction outer side of the frame member and on the front side of the pillar.

3. The side vehicle body structure of a vehicle according to claim 2,
wherein, below the frame member, the exhaust pipe is routed, the exhaust pipe connecting the internal combustion engine disposed on an inner side of the frame member in a vehicle width direction and the exhaust system member disposed on an outer side of the frame member in the vehicle width direction.

4. The side vehicle body structure of a vehicle according to claim 3,
wherein, in the vehicle body structure, a portion overlapping with the exhaust system member in a vehicle front view is located on a vehicle rear side relative to the exhaust system member.

5. The side vehicle body structure of a vehicle according to claim 4,
wherein the vehicle body structure comprises a front extending portion extending toward the vehicle front side up to at least immediately under the exhaust system member.

6. The side vehicle body structure of a vehicle according to claim 2,
wherein, in the vehicle body structure, a portion overlapping with the exhaust system member in a vehicle front view is located on a vehicle rear side relative to the exhaust system member.

7. The side vehicle body structure of a vehicle according to claim 6,
wherein the vehicle body structure comprises a front extending portion extending toward the vehicle front side up to at least immediately under the exhaust system member.

8. The side vehicle body structure of a vehicle according to claim 2, wherein the exhaust system member comprises a gasoline particulate filter.

9. The side vehicle body structure of a vehicle according to claim 8, wherein
the gasoline particulate filter comprises a body in which a filter is located and a connection portion having a width smaller than a width of the body; and
at least a portion of the body is disposed in a vehicle body lower portion on the vehicle front side relative to the pillar and on the vehicle-width-direction outer side relative to a tire stopper frame.

* * * * *